Jan. 6, 1931.  W. GOERG  1,788,358

CHECK VALVE OPERATING IN THE DIRECTION OF NORMAL FLOW

Original Filed Sept. 26, 1924

INVENTOR
Walter Goerg
BY
ATTORNEY

Patented Jan. 6, 1931

1,788,358

UNITED STATES PATENT OFFICE

WALTER GOERG, OF WOODCLIFF, NEW JERSEY, ASSIGNOR TO AIR REDUCTION COMPANY, INCORPORATED, OF NEW YORK, N. Y., A CORPORATION OF NEW YORK

CHECK VALVE OPERATING IN THE DIRECTION OF NORMAL FLOW

Original application filed September 26, 1924, Serial No. 740,136. Divided and this application filed April 4, 1928. Serial No. 267,418.

The purpose of the invention is to provide a simple, effective and completely automatic device for checking abnormal flow or pressure proceeding or acting in the direction of normal flow, in a gas line or main or other fluid conduit or passage, and for automatically restoring full flow when conditions have become sufficiently equalized at the upstream and downstream sides of the device.

The device is placed substantially horizontally, or at an inclination, in the conduit and embodies a ball chamber with a main port, and a by-pass past said main port from the upstream to the downstream side of the port, together with a ball in the chamber at the upstream side of the port and normally clear of said port, the chamber presenting an incline up which the ball may be driven to close the port without, however, closing the by-pass. In event of a sudden rush of fluid or of excessive pressure, or pressure differential, proceeding from the source of supply, the ball is closed temporarily against the main port. As the result of fluid passing through the restricted by-pass, the pressure at the downstream side of the main port is allowed to build up to a value at which the ball is no longer held against the main port and therefore rolls back down the incline, reopening the passage.

Important advantages of this device are that it does not rely upon a spring, that it requires no slidably guided parts and no walls disposed across the interior of the chamber and that it permits of substantially straight-line flow.

Figure 1:
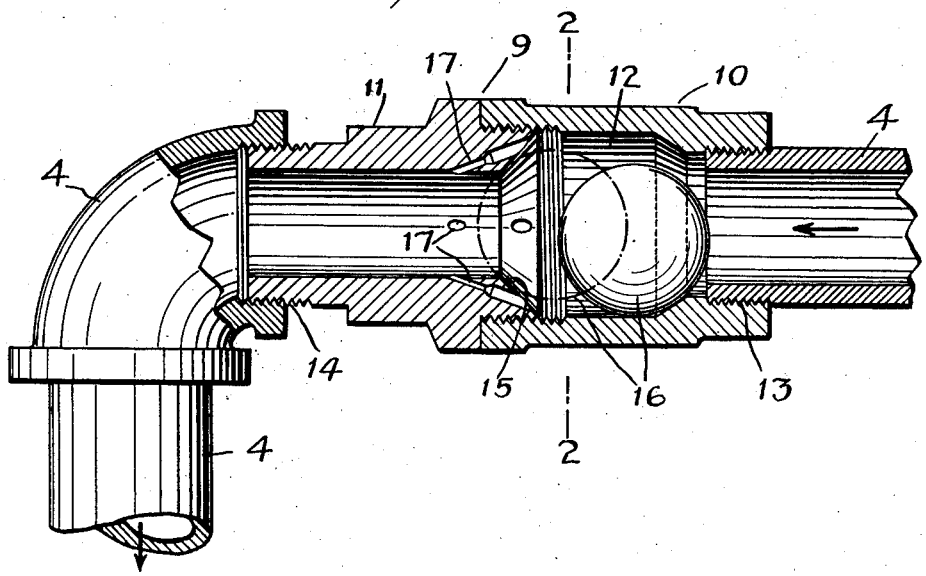
Figure 2:
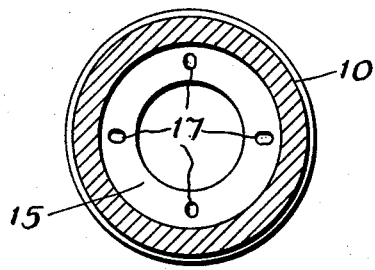

In the accompanying drawings forming part hereof:

Fig. 1 is a view partly in longitudinal section and partly in elevation of a portion of a conduit containing the invention, the ball being shown in two positions in full and broken lines; and Fig. 2 is a cross-section on the line 2—2 of Fig. 1.

The numeral 4 designates certain pipe and fitting elements of a conduit, for example, a gas line. The arrows indicate the direction of flow from the source toward the point of consumption or delivery, or toward a piece of apparatus which it is desirable to protect from excessive flow or pressure.

Interposed in the line is a casing 9 forming a substantially horizontal, or upwardly inclined, section of the conduit. This casing is advantageously made of two special pipe fittings 10 and 11 screwed together to form an enlarged ball chamber 12, the remote portions of the two parts being screw-threaded at 13 and 14 for connection to the adjoining portions of the line. The bore of the outlet section 11 constitutes a main port for conducting the normal flow of fluid, and at the entrance end of this port, in the said section, a conical seat 15 is formed, providing an incline up which a ball 16 of substantial mass must be driven to seat against the seat. The closure is preferably a solid rubber ball, of which the rubber is dead rather than springy.

Fine or restricted by-pass ports 17, one, two or more in number, are drilled diagonally through the wall of the section 11, the inlets of the by-pass ports being outside the ring of actual seating of the ball, and their outlets opening into the main port beyond the seat.

The mass of the ball in relation to the incline 15 is such that the ball remains away from closing relation to the main port during ordinary conditions of flow and pressure.

When the flow is first turned on, if there should be a sudden rush of fluid which it would be undesirable to allow to proceed beyond the checking device, the ball will be driven up the incline into closing engagement with the main port. Thereby the flow is substantially cut off and the influence of excessive pressure on farther parts of the system is cut off. The flow is not entirely closed, however, since the restricted by-pass orifices 17 remain open. The fluid which passes through these orifices gradually, within a certain period, which may be brief or more prolonged depending upon the conditions, builds up pressure in the portion of the conduit or system at the downstream side of the main port, and eventually a balance results which permits the ball to roll down the incline away from the main port, thereby restoring the free passageway.

If for any reason during the operation of the system the rate of flow or the pressure differential should become too high, as in event of a break in the line or system beyond the checking device, the closure will become operative, cutting off all but a minor flow.

The invention is applicable for various specific purposes and in various systems for performing functions of the general kind indicated.

This application is a division of application Serial No. 740,136, filed September 26, 1924.

I claim:

1. In a fluid line, a device for checking abnormal flow proceeding in the direction of normal flow, said device having a ball chamber with a main outlet port therefrom and an incline leading to said port, and a ball lying in said ball chamber adapted to be driven by the pressure up said incline to close said main port, there being a restricted by-pass past the main port thus closed for building up pressure beyond the closed main port to a point such that the ball will roll away from said port.

2. In a fluid line, a device for checking abnormal flow proceeding in the direction of normal flow, said device having a ball chamber with a main outlet port therefrom, and a rubber ball in said chamber adapted to be driven by the pressure to close said main port, there being a restricted by-pass past the main port thus closed for buliding up pressure beyond the closed main port to a point such that the ball will roll away from said port.

WALTER GOERG.